(12) United States Patent
Imayoshi

(10) Patent No.: US 11,544,017 B2
(45) Date of Patent: Jan. 3, 2023

(54) IMAGE FORMING APPARATUS DISPLAYING CONFIRMATION DIALOGUE BASED ON PREVIOUS LOGIN INFORMATION EXISTENCE

(71) Applicant: SHARP KABUSHIKI KAISHA, Sakai (JP)

(72) Inventor: Kenichiroh Imayoshi, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 17/409,416

(22) Filed: Aug. 23, 2021

(65) Prior Publication Data
US 2022/0066711 A1  Mar. 3, 2022

(30) Foreign Application Priority Data
Aug. 28, 2020 (JP) ............................. JP2020-144529

(51) Int. Cl.
*G06F 3/12* (2006.01)
*G06F 21/62* (2013.01)

(52) U.S. Cl.
CPC .......... *G06F 3/1222* (2013.01); *G06F 3/1221* (2013.01); *G06F 3/1238* (2013.01); *G06F 21/629* (2013.01)

(58) Field of Classification Search
None
See application file for complete search history.

(56) References Cited

U.S. PATENT DOCUMENTS

| | | | |
|---|---|---|---|
| 2013/0050736 A1* | 2/2013 | Akahira | ............. H04N 1/00037 358/1.14 |
| 2015/0029539 A1* | 1/2015 | Kim | ..................... H04N 1/0035 358/1.15 |

FOREIGN PATENT DOCUMENTS

JP  2018089983 A  6/2018

* cited by examiner

*Primary Examiner* — Thomas D Lee
(74) *Attorney, Agent, or Firm* — ScienBiziP, P.C.

(57) ABSTRACT

An image forming apparatus, includes: an image generator; a motion sensor; a login-logout processor; a display; a console; a memory; an on-hold setting receiver that receives a setting to either hold or cancel a set value not completely entered, when the motion sensor is not able to detect the user; and a controller that controls the image generator, the motion sensor, the login-logout processor, the display, the console, the memory, and the on-hold setting receiver. The controller causes the memory to store the set value not completely entered and switches a setting screen if the on-hold setting receiver is set to hold the setting not completely entered when the motion sensor is not able to detect the user while the display displays the setting screen, and cancels the set value not completely entered and switches the setting screen if the on-hold setting receiver is set to cancel the setting not completely entered.

5 Claims, 11 Drawing Sheets

FIG.5

SYSTEM SETTING > POWER-SAVE SETTING

ON-HOLD SETTING OF A SET VALUE WITH THE MOTION SENSOR WHEN NO USER ATTENDS

○ CANCEL THE NOT COMPLETELY ENTERED SETTING

◉ HOLD THE NOT COMPLETELY ENTERED SETTING

FIG.6

| MOTION SENSOR | NOT COMPLETELY ENTERED SETTING ON-HOLD/CANCEL | SETTING STATE |
|---|---|---|
| STATE IN WHICH HUMAN BODY IS DETECTED | HOLD | KEEP DISPLAYING SETTING SCREEN |
| | CANCEL | |
| TRANSITION FROM STATE IN WHICH HUMAN BODY IS DETECTED TO STATE IN WHICH HUMAN BODY IS UNDETECTED | HOLD | EXECUTE PROCESSING FOR LOGOUT WITH NOT COMPLETELY ENTERED SETTING MAINTAINED |
| | CANCEL | EXECUTE PROCESSING FOR LOGOUT AFTER NOT COMPLETELY ENTERED -SETTING IS CANCELED |

FIG.11

FOUND AN ON-HOLD SETTING. SELECT AN OPTION.

⦿ CANCEL

○ APPLY THE PREVIOUSLY ON-HOLD SET VALUE
(NEITHER REGISTERED NOR CONFIRMED)

OK

171

SYSTEM SETTING > POWER-SAVE SETTING

ON-HOLD SETTING OF A SET VALUE WITH THE MOTION SENSOR
WHEN NO USER ATTENDS

○ CANCEL THE NOT COMPLETELY ENTERED SETTING

◉ HOLD THE NOT COMPLETELY ENTERED SETTING

WAITING TIME PERIOD UNTIL THE LOGOUT AFTER THE
MOTION SENSOR IS NOT ABLE TO DETECT THE USER: [ 30 ] SECONDS

IMAGE FORMING APPARATUS DISPLAYING CONFIRMATION DIALOGUE BASED ON PREVIOUS LOGIN INFORMATION EXISTENCE

CROSS-REFERENCE TO RELATED APPLICATION

The present application claims priority from Japanese Patent Application Number 2020-144529, the content to which is hereby incorporated by reference into this application.

BACKGROUND OF THE INVENTION

1. Field of the Invention

An aspect of the present invention relates to image forming apparatuses and, in particular, an image forming apparatus including a motion sensor.

2. Description of the Related Art

A multifunction printer operates in several power states, including a normal mode and a power-save mode.

The multifunction printer includes a user detection apparatus such as a motion sensor (a human body detection sensor) and an imaging apparatus such as a camera. Once the multifunction printer is not able to detect a human body, the power state transits from the normal mode to the power-save mode after a lapse of a predetermined time period.

When the motion sensor detects a human body in the power-save mode, the power state returns from the power-save mode to the normal mode.

An invention discloses a conventional image forming apparatus including such a motion sensor. When detecting that a user authenticated to log in the image forming apparatus moves away from the image forming apparatus at a first distance or farther, the image forming apparatus locks the operation screen (see, for example, Japanese Unexamined Patent Application Publication No. 2018-089983).

SUMMARY OF THE INVENTION

The user sometimes has to leave the multifunction printer for some reasons while the setting screen is open. In such a case, the setting screen is left open, causing a risk that an unauthorized person would peek at the setting screen.

An aspect of the present invention is conceived in view of the above problem, and is intended to provide an image forming apparatus to prevent the setting screen from being peeked at without compromising on user convenience unlike a conventional image forming apparatus, even if the user leaves the multifunction printer while the setting screen is open.

(1) An image forming apparatus according to an aspect of the present invention includes: an image generator; a motion sensor; a login-logout processor that executes processing for a login and a logout in accordance with a result of authentication of a user; a display that displays a setting screen for the image generator; a console that receives an operation to set the setting screen; a memory that stores a set value of the setting screen; an on-hold setting receiver that receives a setting to either hold or cancel the set value not completely entered, when the motion sensor is not able to detect the user; and a controller that controls the image generator, the motion sensor, the login-logout processor, the display, the console, the memory, and the on-hold setting receiver. The controller causes the memory to store the set value not completely entered and switches the setting screen if the on-hold setting receiver is set to hold the setting not completely entered when the motion sensor is not able to detect the user while the display displays the setting screen, and cancels the set value not completely entered and switches the setting screen if the on-hold setting receiver is set to cancel the setting not completely entered.

In an aspect of the present invention, the "image forming apparatus", generating and outputting an image, includes a photocopier having a function of making a photocopy such as a printer utilizing xerography for printing an image with toner, and a multifunction peripheral (MFP) having function other than making a photocopy.

The "motion sensor" includes a user detection apparatus such as a motion sensor (a human body detection sensor) and an imaging apparatus such as a camera, and detects a human body entering a predetermined region.

The "set value not completely entered" is a set value that the user enters or changes. The entry or the change of the "set value not completely entered" is neither confirmed nor registered.

To "switch the setting screen" is, for example, to close the setting screen to transit to a home screen for the user to set a photocopy/fax/scan function, to a user authentication screen (an ID/password entry screen) for entry in authentication of the user, and a transition screen (an ID/password entry screen) to an administrator mode to be set by an administrator.

Thanks to an aspect of the present invention, the image forming apparatus switches the setting screen after saving or canceling the set value not completely entered. Such a feature makes it possible to prevent the setting screen from being peeked at without compromising on user convenience unlike a conventional image forming apparatus, even if the user leaves the multifunction printer while the setting screen is open.

Further described below are preferable aspects of the present invention.

(2) The image forming apparatus may further include the login-logout processor that executes processing for a login and a logout in accordance with a result of authentication of a user. The controller may cause the memory to store the set value not completely entered, switch the setting screen, and cause the login-logout processor to execute the processing for the logout if the on-hold setting receiver is set to hold the setting not completely entered when the motion sensor is not able to detect the user while the display displays the setting screen after the login by the user, and cancel the set value not completely entered, switches the setting screen, and cause the login-logout processor to execute the processing for the logout if the on-hold setting receiver is set to cancel the setting not completely entered Thanks to such features, the image forming apparatus executes the processing for the logout after saving or canceling the set value not completely entered. Hence, the image forming apparatus can prevent the setting screen from being peeked at without compromising on user convenience unlike a conventional image forming apparatus, even if the user leaves the multifunction printer while the setting screen is open.

(3) If, after the login of the user, the set value stored at a previous login by the user exists, the controller may cause the display to display the setting screen to which the set value is applied.

Thanks to such a feature, if the set value stored at the previous login exists when the user logs in, the setting screen is automatically displayed with the set value applied thereto. Hence, the feature can provide the image forming apparatus with great user convenience.

(4) If, after the login of the user, the set value stored at a previous login by the user exists, the controller may cause the display to display a confirmation dialogue to ask the user to select whether to apply the set value. If the selection received with the console is to apply the set value, the controller may cause the display to display the setting screen to which the set value is applied. If the selection received with the console is to cancel the set value, the controller may cause the display to display a predetermined home screen.

Thanks to such a feature, if the set value stored at the previous login exists when the user logs in, the confirmation dialogue is displayed to ask the user to select whether to apply the set value. Hence, the feature can provide the image forming apparatus with great user convenience.

(5) The on-hold setting receiver may receive a setting to automatically apply the set value on hold. If, after the login of the user, the set value stored at a previous login by the user exists, and if the on-hold setting receiver is set to automatically apply the set value on hold, the controller may cause the display to display the setting screen to which the set value is applied.

Thanks to such a feature, if the set value stored at the previous login exists when the user logs in, and if the on-hold setting receiver is set to automatically apply the set value, the setting screen is automatically displayed with the set value applied thereto. Hence, the feature can provide the image forming apparatus with great user convenience.

(6) The on-hold setting receiver may receive a setting to manually apply the set value on hold. If, after the login of the user, the set value stored at a previous login by the user exists, and if the on-hold setting receiver is set to manually select the set value on hold, the controller may cause the display to display a confirmation dialogue to ask the user to select whether to apply the set value. If the selection received with the console is to apply the set value, the controller may cause the display to display the setting screen to which the set value is applied. If the selection received with the console is to cancel the set value, the controller may cause the display to display a predetermined home screen.

Thanks to such features, if the set value stored at the previous login exists when the user logs in, and if the on-hold setting receiver is set to manually select the set value, the determination is made whether to display the setting screen to which the set value is applied in accordance with the result of selecting the confirmation dialogue. Hence, the feature can provide the image forming apparatus with great user convenience.

BRIEF DESCRIPTION OF THE DRAWINGS

FIG. 5 is a drawing illustrating an example of an on-hold setting of a set value when the digital multifunction printer in FIG. 1 is unattended by a user;

FIG. 6 is a table showing a corresponding relationship between a human body detection state and a process of a not completely entered setting in the digital multifunction printer in FIG. 1;

FIG. 11 is a drawing illustrating an example of a processing confirmation dialogue for an on-hold setting of the digital multifunction printer according to the second embodiment of the present invention;

DETAILED DESCRIPTION OF THE INVENTION

Described below are embodiments of the present invention, with reference to the drawings. Note that the description below are examples in all respects, and shall not be interpreted to limit the scope of the present invention.

First Embodiment

Described below with reference to FIGS. 1 to 4 is a digital multifunction printer 1; that is, an embodiment of an image forming apparatus according to the present invention.

Figure 1:
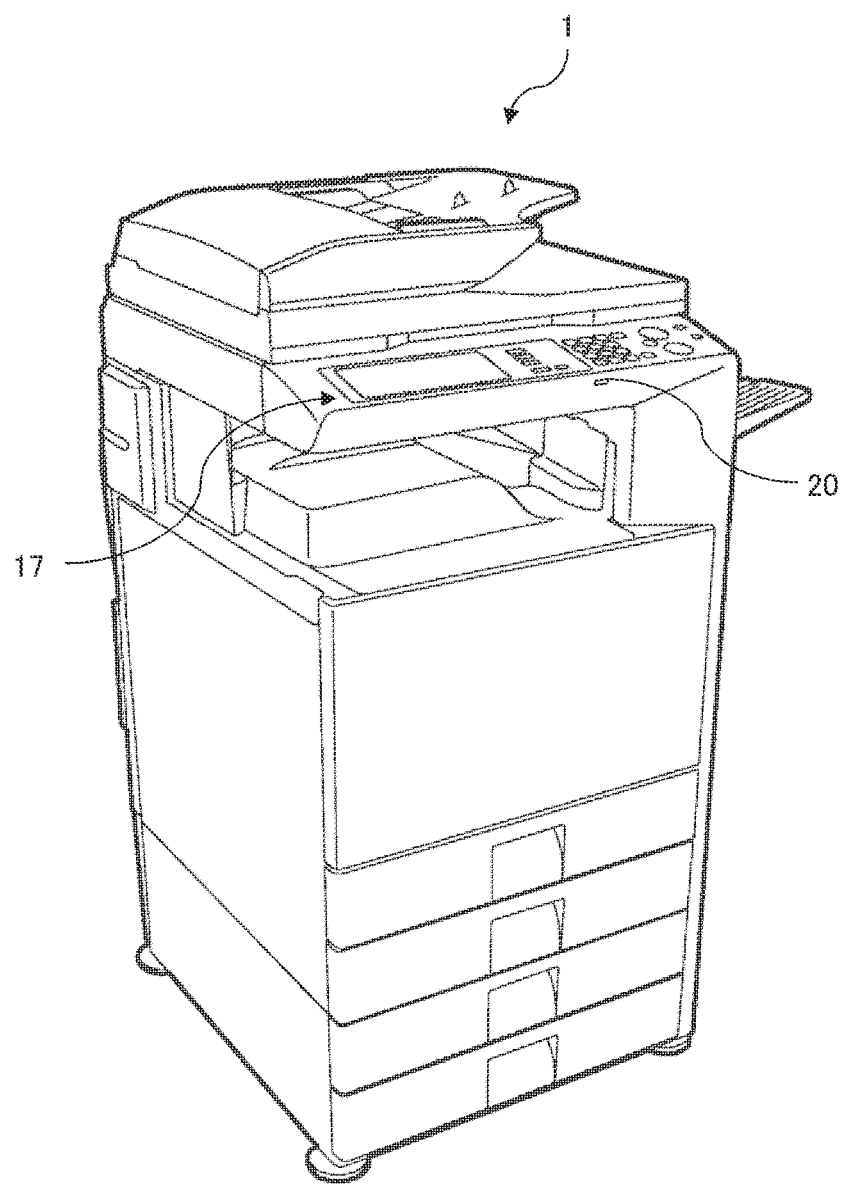
FIG. 1 is a perspective view illustrating an appearance of a digital multifunction printer; that is, an embodiment of an image forming apparatus according to the present invention.
Figure 2:
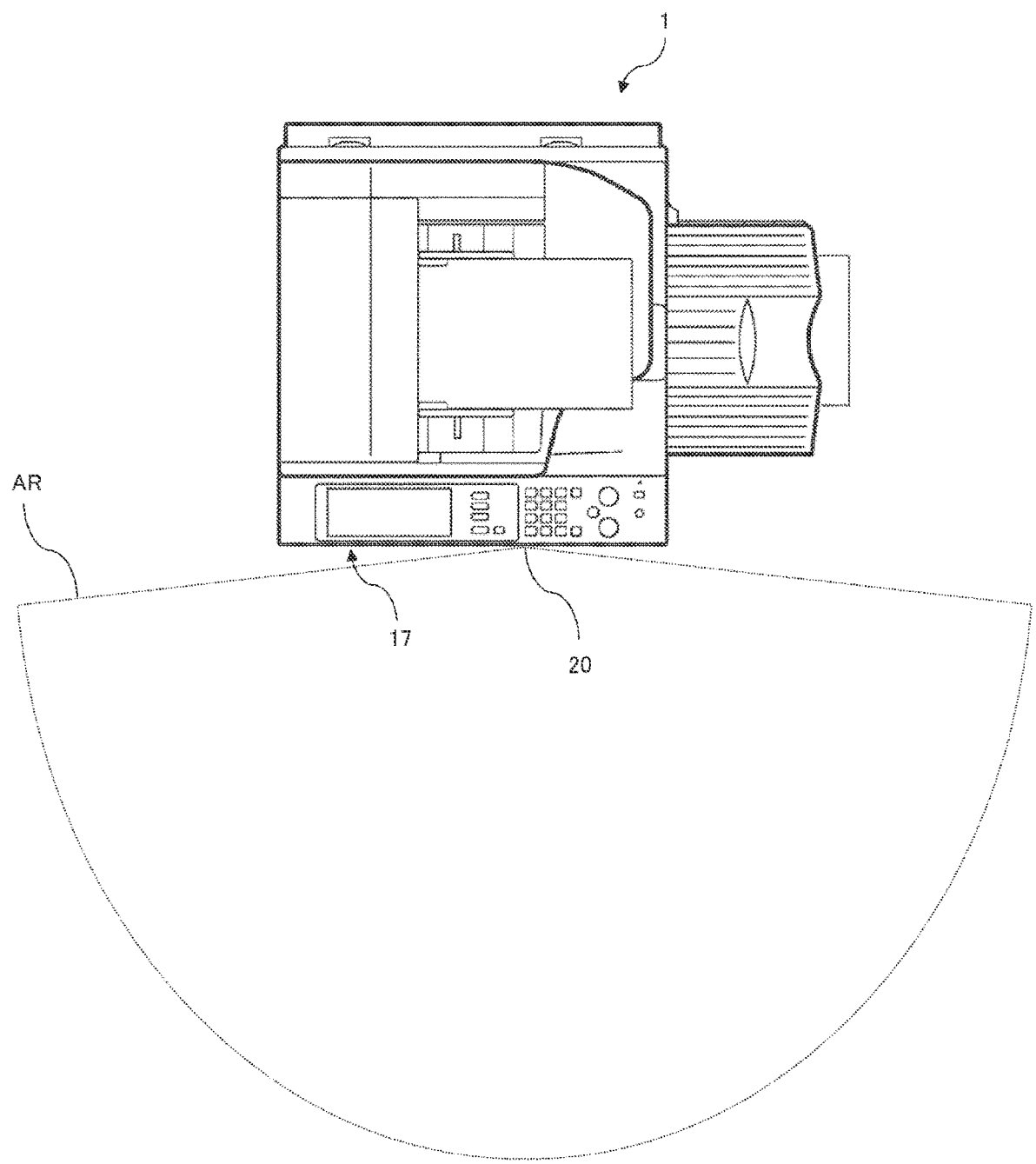
FIG. 2 is a plan view of the digital multifunction printer in FIG. 1.
Figure 3:
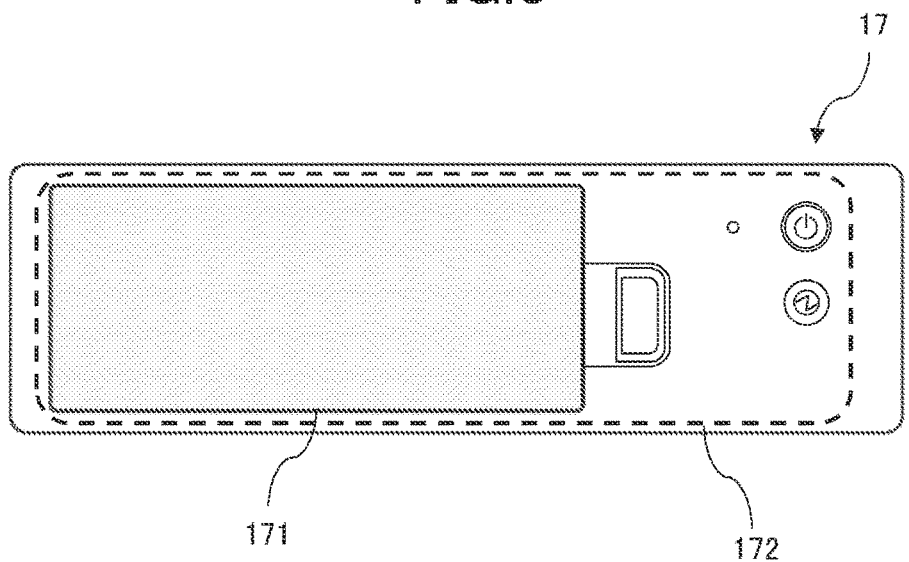
FIG. 3 is a drawing illustrating an operation panel of the digital multifunction printer in FIG. 1.
Figure 4:
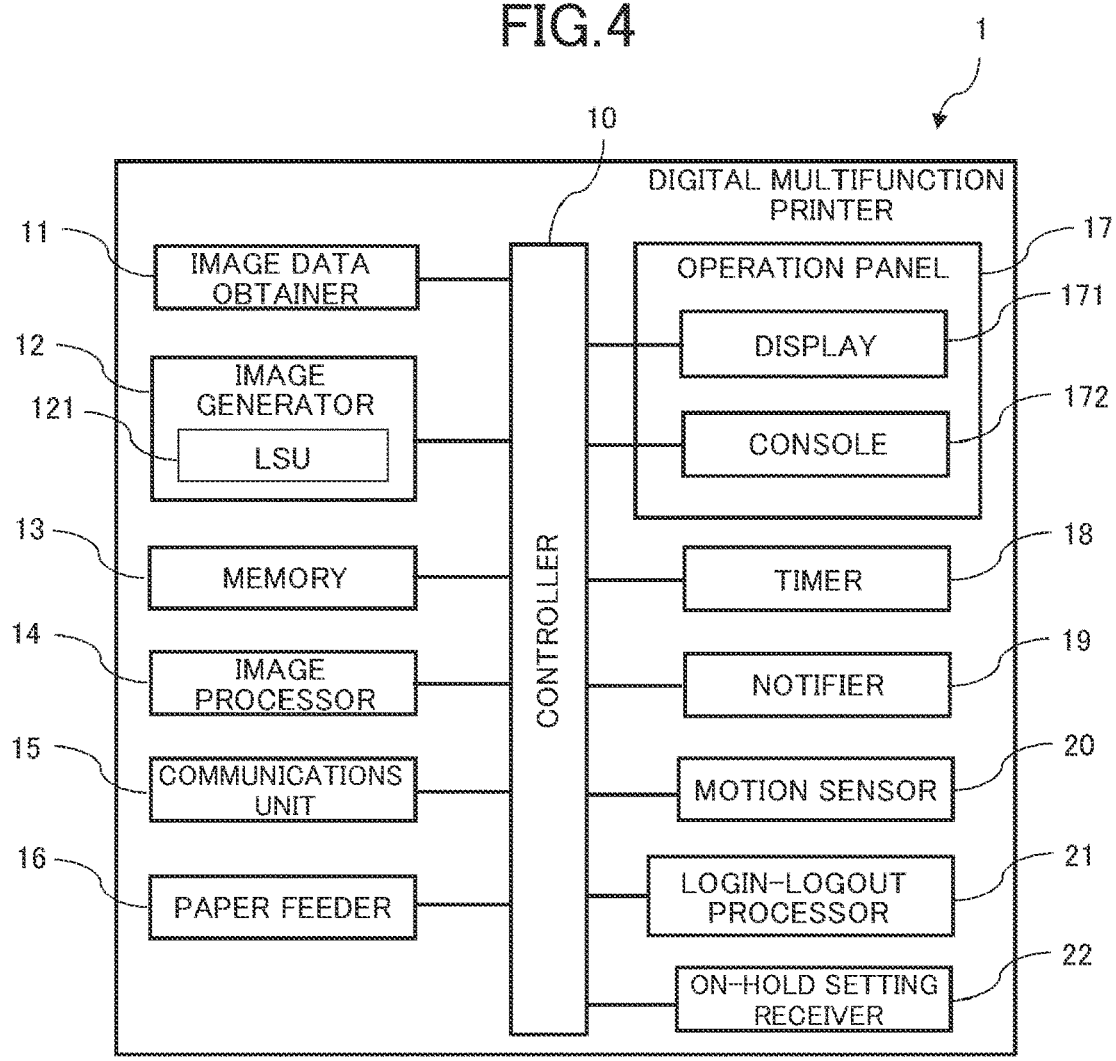
FIG. 4 is a block diagram illustrating a schematic configuration of the digital multifunction printer in FIG. 1.

FIG. 1 is a perspective view illustrating an appearance of the digital multifunction printer 1; that is, an embodiment of an image forming apparatus according to the present invention. FIG. 2 is a plan view of the digital multifunction printer 1 in FIG. 1. FIG. 3 is a drawing illustrating an operation panel 17 of the digital multifunction printer 1 in FIG. 1. FIG. 4 is a block diagram illustrating a schematic configuration of the digital multifunction printer 1 in FIG. 1.

The digital multifunction printer 1 is such an apparatus as a multifunction printer and a multifunction peripheral (MFP) digitally processing image data and capable of photocopying, printing, scanning, and sending and receiving a fax.

As illustrated in FIGS. 1 and 2, the digital multifunction printer 1 includes: the operation panel 17; and a motion sensor 20 provided to the front of the operation panel 17.

As illustrated in FIG. 3, the operation panel 17 includes: a display 171; and a console 172.

Next, a schematic configuration of the digital multifunction printer 1 is briefly described, with reference to FIG. 4.

As illustrated in FIG. 4, the digital multifunction printer 1 includes: a controller 10; an image data obtainer 11; an image generator 12; a memory 13; an image processor 14; a communications unit 15; a paper feeder 16; the operation panel 17; a timer 18; a notifier 19; the motion sensor 20; a login-logout processor 21; and an on-hold setting receiver 22.

Described below are the constituent features of the digital multifunction printer 1.

The controller 10, integrally controlling the digital multifunction printer 1, includes a CPU, a RAM, a ROM, and various interface circuits.

In order to control the whole operation of the digital multifunction printer 1, the controller 10 monitors and controls loads in every respect such as detection by the sensors, a motor, a clutch, and the operation panel 17.

The image data obtainer 11 detects to read a document placed on a platen or transported from a document tray, and generates image data. Moreover, the image data obtainer 11 obtains image data generated by a not-shown external information processing apparatus or fax apparatus.

The image generator 12 prints, on a paper sheet, the image data obtained by the image data obtainer 11 and processed by the image processor 14. The image generator 12 includes a laser scanning unit (LSU) 121.

The LSU 121 emits a laser beam, corresponding to information on the image data including digital signals, to the surface of the electrically charged photoconductive drum, and generates an electrostatic latent image.

The memory 13 is an element and a storage medium that stores a control program and information required to achieve various functions of the digital multifunction printer 1. Examples of the memory 12 include such storage media as a semiconductor element including a RAM and a ROM, a hard disk, a flash memory, and an SSD.

Note that the program and the data may be stored in different apparatuses. For example, the data may be held in the hard disk drive and the program may be held in the flash memory.

The image processor 14 converts the document image, read by the image data obtainer 11, into an appropriate electric signal to generate image data. The image processor 14 then processes the image data, input from the image data obtainer 11, to suit such output as enlargement and reduction in accordance with an instruction from the console 172.

The communications unit 15 holds communication through, for example, a network with such external devices as an image processing device, a computer, a PDA, an information processing apparatus, and a fax apparatus, and transmits and receives various kinds of information such as e-mail and a fax to and from these external devices.

The paper feeder 16 transports to the image generator 12 a paper sheet stored in a paper cassette and a bypass tray.

The operation panel 17, provided with a liquid crystal display (LCD), includes the display 171 and the console 172.

The display 171 displays various kinds of information. The display 171 includes, for example, a CRT display, an LCD, and an EL display. The display 171 is, for example, a monitor and a line display for displaying such electronic data as processing states of the operating system and the application software. The controller 10 displays, through the display 171, an operation and a state of the digital multifunction printer 1.

The console 172 includes such physical operation keys as a touch panel and a power key, and receives an instruction from the user.

The timer 18 measures time and obtains a time point through, for example, a built-in clock and a network.

The notifier 19 causes such a sound generation apparatus as a speaker to generate, for example, a sound of a beeper and a voice message, and sends, for example, a warning and a message around.

The motion sensor 20 detects an intruder found in a predetermined region AR.

In FIG. 2, the region AR, shaped into a sector, defines a region in which the intruder is detected by the motion sensor 20. When a human body enters the region AR, the motion sensor 20 detects the person.

The motion sensor 20 is, for example, a pyroelectric infrared sensor including a pyroelectric element to detect a variation of infrared radiation caused by a motion of the intruder in the region AR.

Moreover, the motion sensor 20 may analyze an image obtained by such an imaging apparatus as a camera to detect an intruder in the region AR. In such a case, the imaging apparatus obtains an image of a predetermined area at predetermined time intervals, and the motion sensor 20 detects presence or absence of a change of the image between two or more obtained frames. If a change is found in the image, the motion sensor 20 determines the detected change as the presence of the intruder.

The motion sensor 20 outputs the detection result when an object is found within a predetermined area (e.g. 0 m to 5 m). The level of the output varies depending on the distance to the object.

The login-logout processor 21 compares such information as a login name and a password entered with the console 172 and information previously stored in the memory 13, and executes processing for a login if the user is authenticated as a legitimate user.

Moreover, the login-logout processor 21 also executes processing for a logout in accordance with a logout instruction entered with the console 172.

When the motion sensor 20 is not able to detect the user, the on-hold setting receiver 22 receives a setting to either hold or cancel a set value not completely entered.

Example of On-Hold Setting of Set Value when Digital Multifunction Printer 1 According to First Embodiment of Present Invention is Unattended by User With reference to FIGS. 5 and 6, described below is an example of an on-hold setting of a set value when the digital multifunction printer 1 according to the first embodiment of the present invention is unattended by the user.

FIG. 5 is a drawing illustrating an example of an on-hold setting of a set value when the digital multifunction printer 1 in FIG. 1 is unattended by the user. FIG. 6 is a table showing a corresponding relationship between a human body detection state and a process of a not completely entered setting in the digital multifunction printer 1 in FIG. 1.

When the user leaves the digital multifunction printer 1 while the setting screen is open in the power-save setting, the user sets whether to cancel or hold the not completely entered setting. The on-hold setting receiver 22 receives the setting of the user.

FIG. 5 shows that, as "On-hold setting of a set value with the motion sensor when no user attends", the user checks either option of "Cancel the not completely entered setting" or "Hold the not completely entered setting."

When the user checks the option "Cancel the not completely entered setting", if the motion sensor 20 is not able to detect a human body while the setting screen is open, the not completely entered setting is canceled.

Meanwhile, when the user checks the option "Hold the not completely entered setting", if the motion sensor 20 is not able to detect a human body while the setting screen is open, the not completely entered setting is held.

The table in FIG. 6 shows that, even if the not completely entered setting is either "Hold" or "Cancel" when the motion sensor 20 detects the human body, the controller 10 keeps displaying the setting screen on the display 171.

If the not completely entered setting is set "Hold" when the motion sensor 20 transits from a state in which the human body is detected to a state in which the human body is undetected, the login-logout processor 21 executes processing for a logout with the not completely entered setting maintained on the setting screen.

Meanwhile, if the not completely entered setting is set "Cancel", the login-logout processor 21 executes the processing for the logout after the not completely entered setting on the setting screen is canceled.

Example of Processing for Logout when Digital Multifunction Printer 1 According to First Embodiment of Present Invention is Unattended by User Next, with reference to FIG. 7, described below is an example of the processing for the logout when the digital multifunction printer 1 according to the first embodiment of present invention is unattended by a user.

Figure 7:
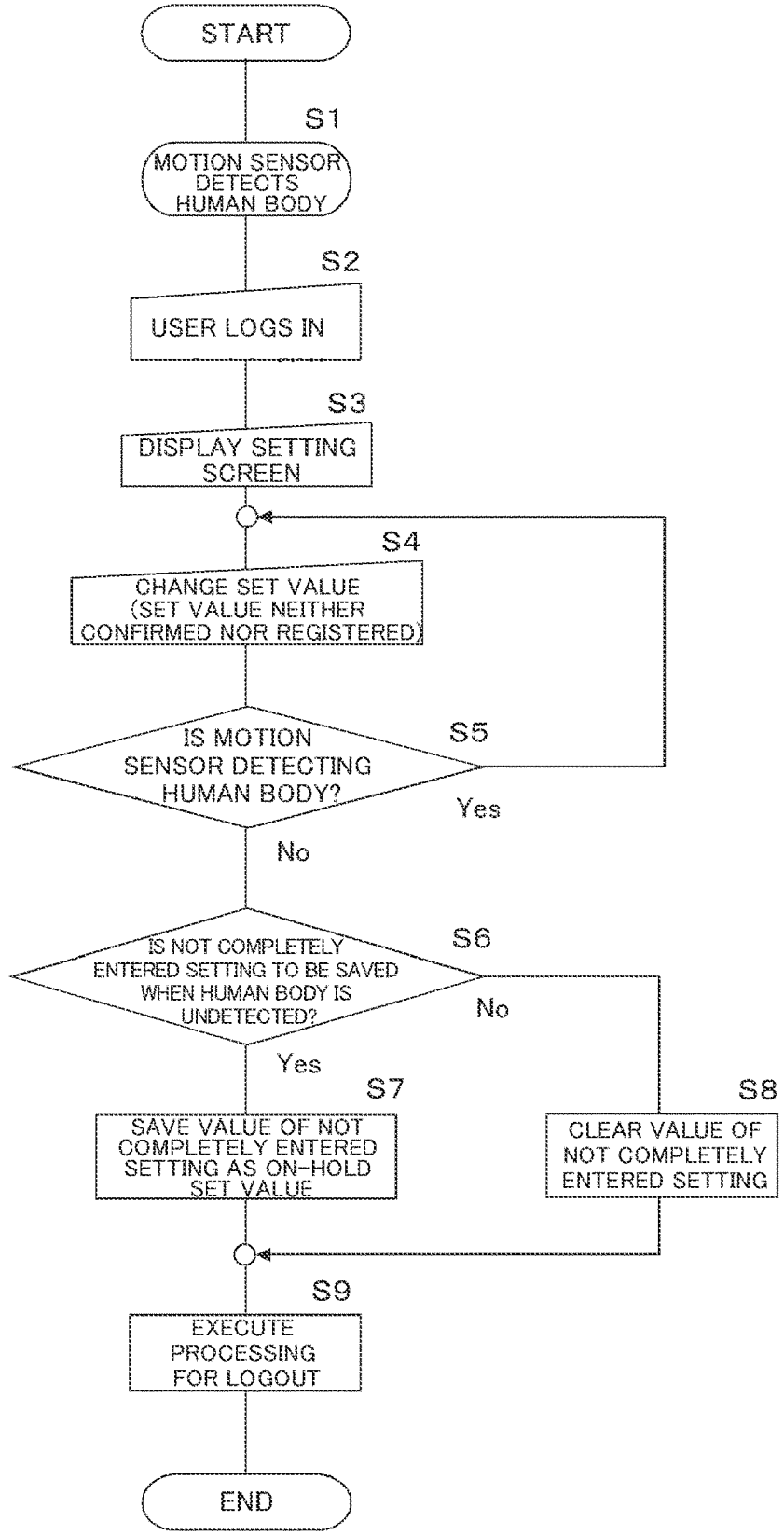
FIG. 7 is a flowchart illustrating a sequence of processing for a logout executed when the digital multifunction printer in FIG. 1 is unattended by the user.

FIG. 7 is a flowchart illustrating a sequence of setting processing executed on the digital multifunction printer 1 in FIG. 1.

At Step S1 in FIG. 7, the motion sensor 20 detects a human body. At Step S2, the console 172 receives an operation of the user to log in.

When the user is authenticated as a legitimate user, the login-logout processor 21 executes the processing for the login.

At Step S3, the user causes the display 171 to display the setting screen. At Step S4, the user assumes a case where a set value is changed.

At this moment, the set value is neither confirmed nor registered.

At Step S5, the controller 10 determines whether the motion sensor 20 is detecting the human body.

If the motion sensor 20 is detecting the human body (the determination at Step S5: Yes), the controller 10 returns the processing to Step S4.

Meanwhile, if the motion sensor 20 is not able to detect the human body (the determination at Step S5: No), the controller 10 determines at Step S6 whether the checked setting is to save the not completely entered setting when the human body is undetected.

At Step S6, if the checked setting is to save the not completely entered setting when the human body is undetected (the determination at Step S6: Yes), the controller 10 at Step S7 saves in the memory 13 a value of the not completely entered setting as an on-hold set value. At Step S9, the login-logout processor 21 executes the processing for the logout. The setting processing ends.

Meanwhile if the checked setting is to cancel the not completely entered setting when the human body is undetected (the determination at Step S6: No), the controller 10 at Step S8 clears the value of the not completely entered setting. At Step S9, the login-logout processor 21 executes the processing for the logout. The setting processing ends.

Hence, even if the user leaves the digital multifunction printer 1 while the setting screen is open, the login-logout processor 21 executes the processing for the logout when the motion sensor 20 is not able to detect the human body. Such a feature allows the digital multifunction printer 1 to keep an unauthorized person from peeking at the setting screen.

Example of Screen Displaying Processing Executed when Digital Multifunction Printer 1 According to First Embodiment of Present Invention is Logged in Again With reference to FIGS. 8 and 9, described next is an example of the screen displaying processing executed when the digital multifunction printer 1 according to the first embodiment of the present invention is logged in again.

Figure 8:
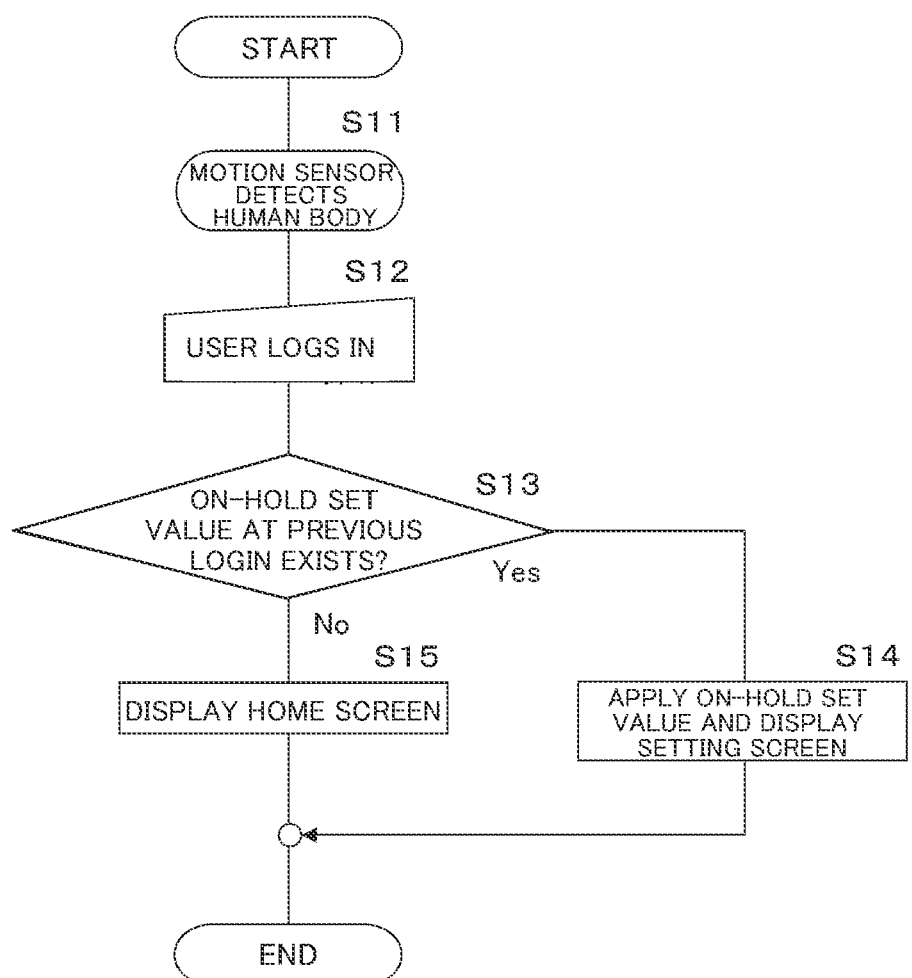
FIG. 8 is a flowchart illustrating a sequence of screen displaying processing executed when the digital multifunction printer in FIG. 1 is logged in again.

FIG. 8 is a flowchart illustrating a sequence of the screen displaying processing executed when the digital multifunction printer 1 in FIG. 1 is re-logged in.

At Step S11 in FIG. 8, the motion sensor 20 detects a human body. At Step S12, the console 172 receives an operation of the user to log in.

When the user is authenticated as a legitimate user, the login-logout processor 21 executes the processing for the login.

At Step S13, the controller 10 determines whether the on-hold set value at the previous login exists.

If the on-hold set value at the previous login exists (the determination at Step S13: Yes), the controller 10 at Step S14 applies the on-hold set value and causes the display 171 to display the setting screen. After that, the processing ends.

Meanwhile, if the on-hold set value at the previous login does not exist (the determination at Step S13: No), the controller 10 at Step S15 causes the display 171 to display the home screen. After that, the processing ends.

The home screen is a predetermined screen displayed by default on the display 171 after the user logs in the digital multifunction printer 1.

Figure 9:
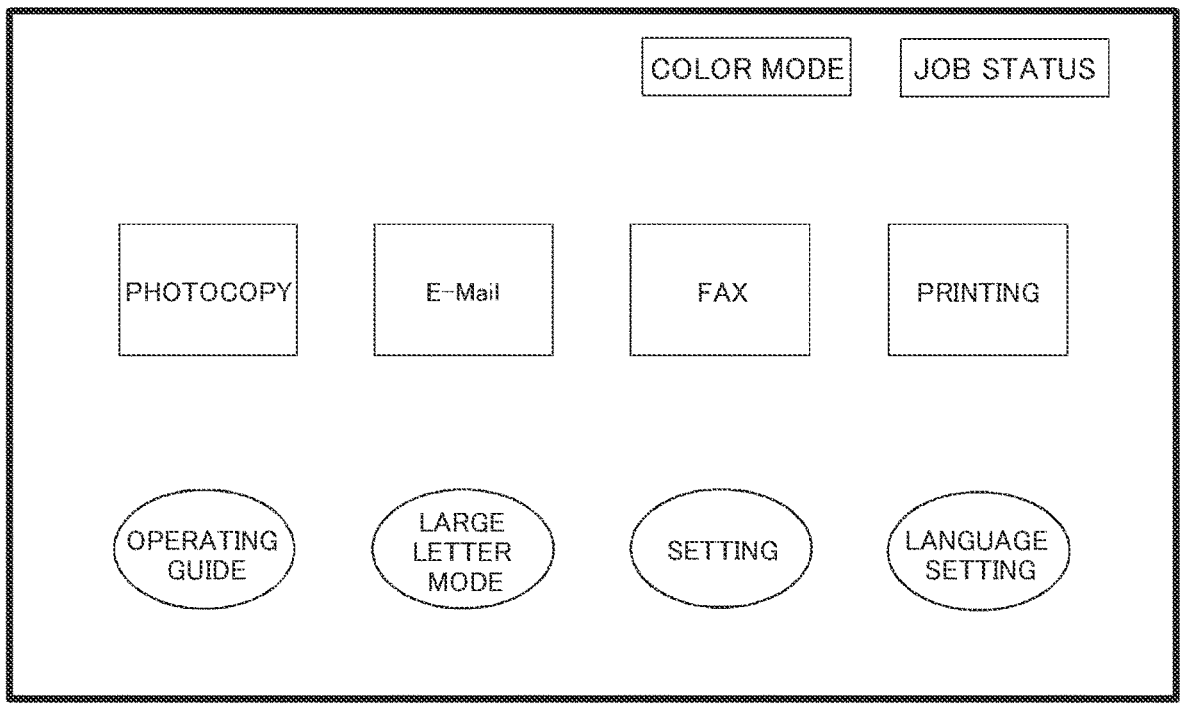
FIG. 9 is a drawing illustrating an example of a home screen displayed on the display of the digital multifunction printer in FIG. 1.

FIG. 9 is a drawing illustrating an example of the home screen displayed on the display 171 of the digital multifunction printer 1 in FIG. 1.

As can be seen, if the not completely entered setting not saved at the previous logout is automatically saved, the display 171 displays the setting screen automatically updated with the automatically saved setting when the same user logs in the digital multifunction printer 1 again. Such a feature can provide the digital multifunction printer 1 with great user convenience.

Second Embodiment

Example of On-Hold Setting of Set Value when Digital Multifunction Printer 1 According to Second Embodiment of Present Invention is Unattended by User With reference to FIGS. 10 and 11, described below is an example of an on-hold setting of a set value when the digital multifunction printer 1 according to a second embodiment of the present invention is unattended by a user.

Figure 10:
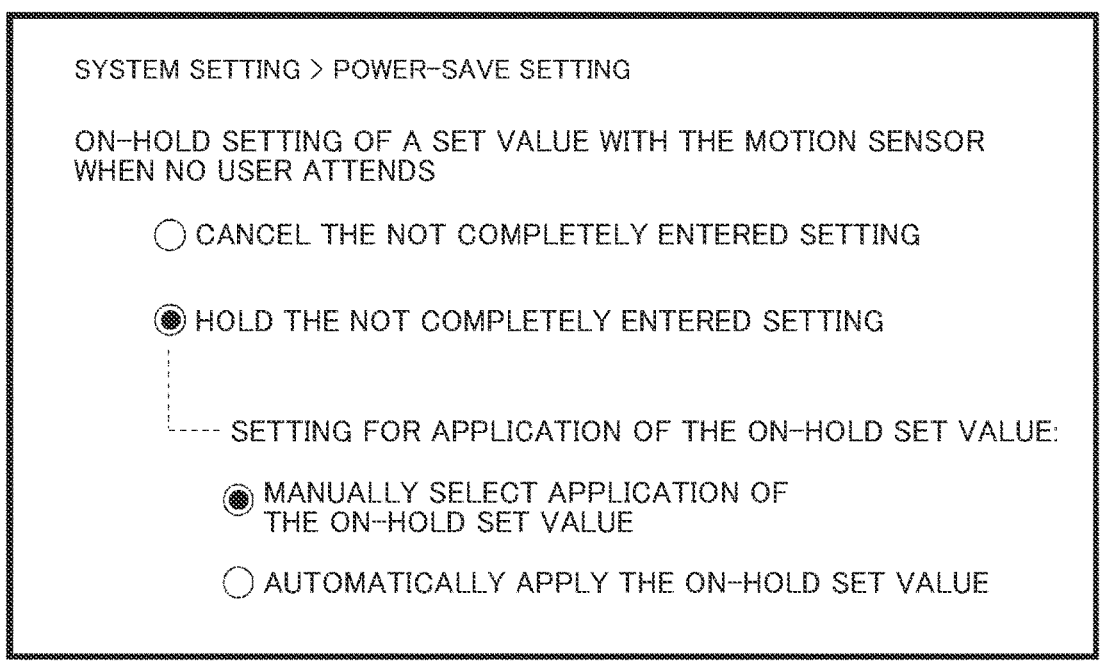
FIG. 10 is a drawing illustrating an example of an on-hold setting of a set value when the digital multifunction printer according to a second embodiment of the present invention is unattended by a user.

FIG. 10 is a drawing illustrating an example of an on-hold setting of a set value when the digital multifunction printer 1 according to a second embodiment of the present invention is unattended by a user. FIG. 11 is a drawing illustrating an example of a processing confirmation dialogue for the on-hold setting of the digital multifunction printer 1 according to the second embodiment of the present invention.

FIG. 10 shows that, as "On-hold setting of a set value with the motion sensor when no user attends", the user checks either option of "Cancel the not completely entered setting" or "Hold the not completely entered setting." Such a setting is the same as that described in the first embodiment (see FIG. 5).

The difference between the second embodiment and the first embodiment is that, when the user checks "Hold the not completely entered setting" in the second embodiment, the user checks either option of "Manually select application of the on-hold set value" or "Automatically apply the on-hold set value" as "Setting for application of the on-hold set value."

When the option "Manually select application of the on-hold set value" is checked, the user can manually select whether to apply the on-hold setting.

Here, as illustrated in FIG. 11, the display 171 displays a message to read, "Found an on-hold setting. Select an option."

The user checks either option of "Cancel" or "Apply the previously on-hold set value (neither registered nor confirmed)", and presses the OK key.

Meanwhile, in "Setting for application of the on-hold set value", if the option "Automatically apply the on-hold set value" is checked, the on-hold setting is automatically applied when the user reopens the setting screen.

Note that the setting processing executed on the digital multifunction printer 1 according to the second embodiment of the present invention is the same as that according to the first embodiment (FIG. 7), and will not be elaborated upon here.

Example of Screen Displaying Processing Executed when Digital Multifunction Printer 1 According to Second Embodiment of Present Invention is Logged in Again With reference to FIG. 12, described next is an example of the screen displaying processing executed when the digital multifunction printer 1 according to the second embodiment of the present invention is logged in again.

Figure 12:
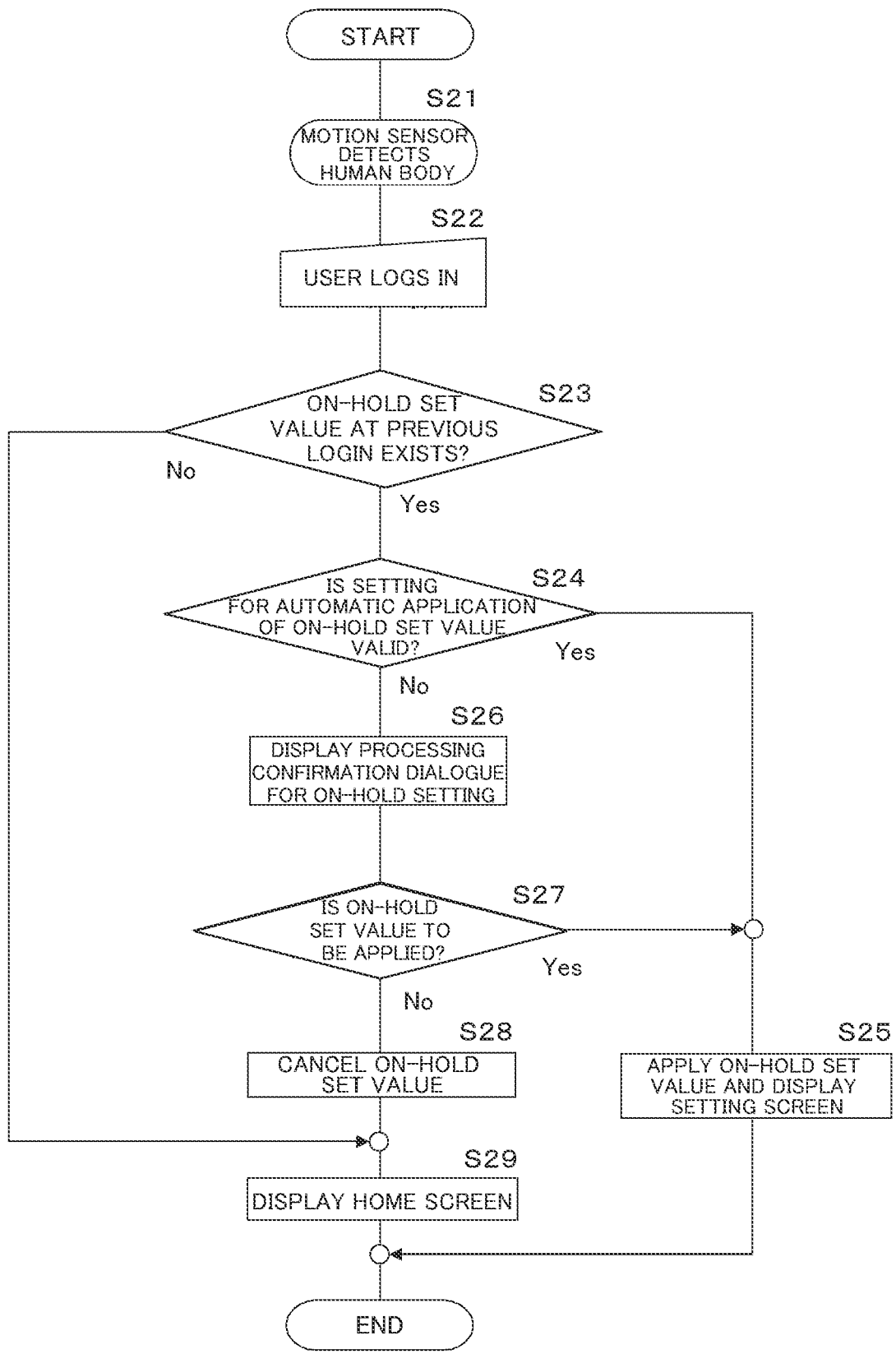
FIG. 12 is a flowchart illustrating a sequence of screen displaying processing executed when the digital multifunction printer according to the second embodiment of the present invention is logged in again.

FIG. 12 is a flowchart illustrating a sequence of the screen displaying processing executed when the digital multifunction printer 1 according to the second embodiment of the present invention is logged in again.

Note that processing at Steps S21 to S23, S25 and S29 in FIG. 12 corresponds to the processing at Steps S11 to S15 in FIG. 8, and will not be elaborated upon here.

Described here is processing at Steps S24 and S26 to S28, which is not shown in FIG. 8.

If, at Step S23, the on-hold set value at the previous login exists (the determination at Step S23: Yes), the controller 10 at Step S24 determines whether the setting for the automatic application of the on-hold set value is valid.

If the setting for the automatic application of the on-hold set value is valid (the determination at Step S24: Yes), the controller 10 at Step S25 applies the on-hold set value and causes the display 171 to display the setting screen. After that, the processing ends.

If the setting for the automatic application of the on-hold set value is invalid (the determination at Step S24: No), the controller 10 at Step S26 causes the display 171 to display the processing confirmation dialogue for the on-hold setting.

At Step S27, the controller 10 determines whether to apply the on-hold set value in accordance with the result of selecting the processing confirmation dialogue for the on-hold setting.

If the on-hold set value is to be applied (the determination at Step S27: Yes), the controller 10 executes the processing at Step 25.

If the on-hold set value is not to be applied (the determination at Step S27: No), the controller 10 at Step S28 cancels the on-hold set value stored in the memory 13. At Step S29, the controller 10 causes the display 171 to display a predetermined home screen. After that, the processing on the controller 10 ends.

As can be seen, if the checked setting is to save the not completely entered setting, the user can freely select either the manual or the automatic application of the on-hold set value. Such a feature can provide the digital multifunction printer 1 with great user convenience.

Third Embodiment

Example of Processing for Logout when Digital Multifunction Printer 1 According to Third Embodiment of Present Invention is Unattended by User Next, with reference to FIGS. 13 and 14, described below is an example of processing for a logout when the digital multifunction printer 1 according to the third embodiment of present invention is unattended by a user.

Figure 13:
FIG. 13 is a drawing illustrating an example of an on-hold setting of a set value when the digital multifunction printer according to a third embodiment of the present invention is unattended by a user.

FIG. 13 is a drawing illustrating an example of an on-hold setting of a set value when the digital multifunction printer 1 according to a third embodiment of the present invention is unattended by a user. FIG. 14 is a flowchart illustrating a sequence of processing for a logout executed when the digital multifunction printer 1 according to the third embodiment of the present invention is unattended by the user.

FIG. 13 shows that, as "On-hold setting of a set value with the motion sensor when no user attends", the user checks either option of "Cancel the not completely entered setting" or "Hold the not completely entered setting." Such a setting is the same as that described in the first embodiment (see FIG. 5).

The difference between the third embodiment and the first embodiment is that, in the third embodiment, the user can set a "Waiting time period until the logout after the motion sensor has stopped detecting the user."

In the example of FIG. 13, the waiting time period is set to 30 seconds.

Figure 14:
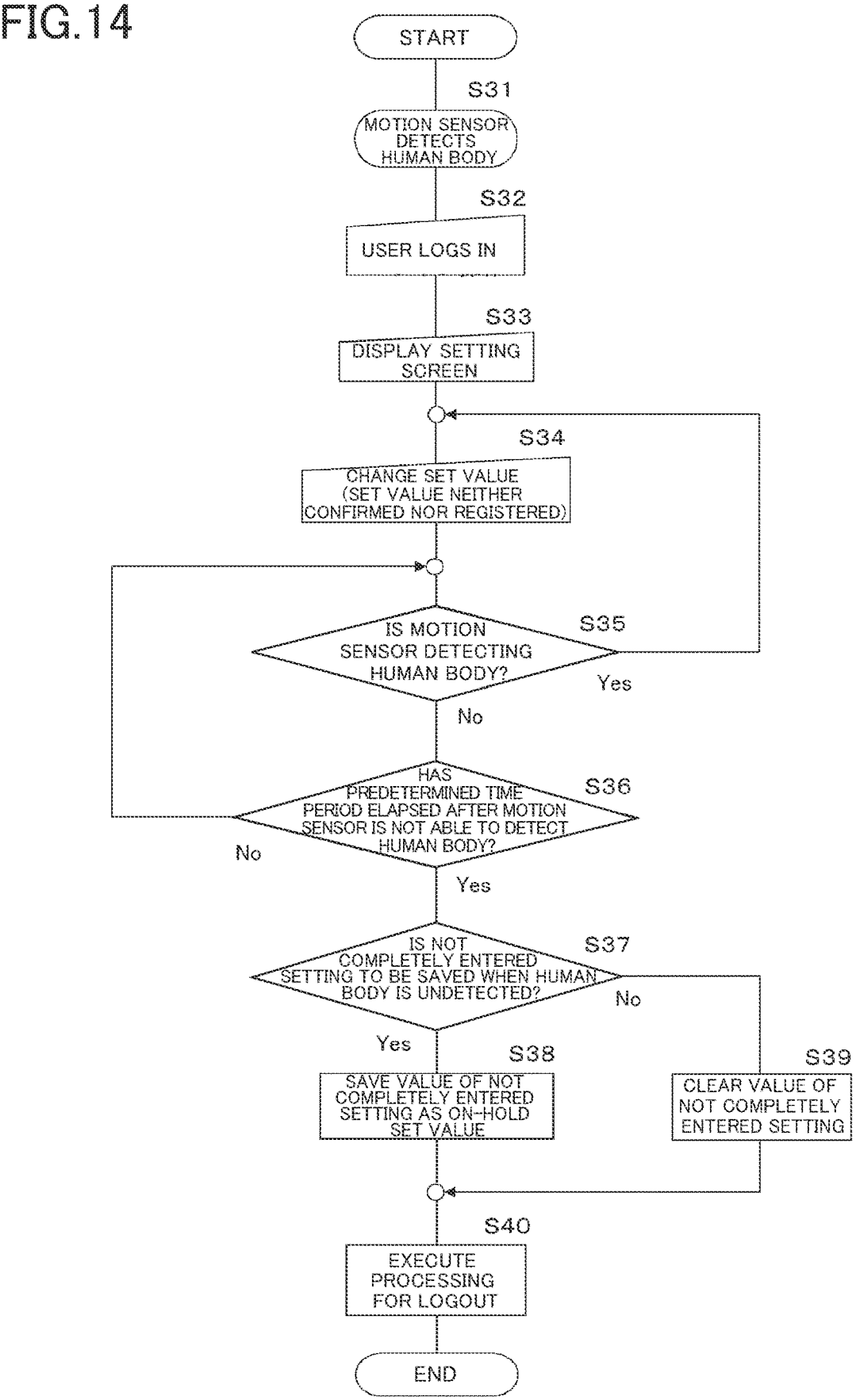
FIG. 14 is a flowchart illustrating a sequence of processing for a logout executed when the digital multifunction printer according to the third embodiment of the present invention is unattended by the user.

Note that processing at Steps S31 to S35 and S37 to S40 in FIG. 14 corresponds to the processing at Steps S1 to S9 in FIG. 7, and will not be elaborated upon here.

Described here is processing at Steps S36, which is not shown in FIG. 7.

At Step S35, if the motion sensor 20 is not able to detect the human body (the determination at Step S35: No), the controller 10 determines at Step S36 whether a predetermined time period has elapsed after the motion sensor 20 is not able to detect the human body.

If, after the motion sensor 20 is not able to detect the human body, the predetermined time period has elapsed (the determination at Step S36: Yes), the controller 10 determines at Step S37 whether the checked setting is to save the not completely entered setting when the human body is undetected.

Meanwhile, if, after the motion sensor 20 is not able to detect the human body, the predetermined time period has not elapsed (the determination at Step S36: No), the controller 10 returns the processing to the determination at Step S35.

As can be seen, the login-logout processor 21 does not execute the processing for the logout immediately after the human body is undetected, but waits until the predetermined time period elapses. Such a feature can provide the digital multifunction printer 1 with great user convenience.

A preferable aspect of the present invention includes a combination of any two or more of the aspects described above.

Other than the above embodiments, the present invention includes various modifications. These modifications shall not be interpreted not to belong to the scope of the present invention. The present invention shall include the claims and all the modifications equivalent to the features of, and within the scope of, the claims.

What is claimed is:

1. An image forming apparatus, comprising:
   an image generator;
   a motion sensor;
   a login-logout processor that executes processing for a login and a logout in accordance with a result of authentication of a user;
   a display that displays a setting screen for the image generator;
   a console that receives an operation to set the setting screen;
   a memory that stores a set value of the setting screen;
   an on-hold setting receiver that receives a setting to either hold or cancel the set value not completely entered, when the motion sensor is not able to detect the user; and
   a controller that controls the image generator, the motion sensor, the login-logout processor, the display, the console, the memory, and the on-hold setting receiver,
   the controller that causes the memory to store the set value not completely entered and switches the setting screen if the on-hold setting receiver is set to hold the setting not completely entered when the motion sensor is not able to detect the user while the display displays the setting screen, and that cancels the set value not completely entered and switches the setting screen if the on-hold setting receiver is set to cancel the setting not completely entered, wherein
   if, after the login of the user, the set value stored at a previous login by the user exists, the controller causes the display to display a confirmation dialogue to ask the user to select whether to apply the set value,
   if the selection received with the console is to apply the set value, the controller causes the display to display the setting screen to which the set value is applied, and
   if the selection received with the console is to cancel the set value, the controller causes the display to display a predetermined home screen.

2. The image forming apparatus according to claim 1, wherein
   the controller causes the memory to store the set value not completely entered, switches the setting screen, and causes the login-logout processor to execute the processing for the logout if the on-hold setting receiver is set to hold the setting not completely entered when the motion sensor is not able to detect the user while the display displays the setting screen after the login by the user, and cancels the set value not completely entered, switches the setting screen, and causes the login-logout processor to execute the processing for the logout if the on-hold setting receiver is set to cancel the setting not completely entered.

3. The image forming apparatus according to claim 1, wherein
   if, after the login of the user, the set value stored at a previous login by the user exists, the controller causes the display to display the setting screen to which the set value is applied.

4. The image forming apparatus according to claim 1, wherein
   the on-hold setting receiver receives a setting to automatically apply the set value on hold,
   if, after the login of the user, the set value stored at a previous login by the user exists, and if the on-hold setting receiver is set to automatically apply the set value on hold, the controller causes the display to display the setting screen to which the set value is applied.

5. An image forming apparatus, comprising:
   an image generator;
   a motion sensor;
   a login-logout processor that executes processing for a login and a logout in accordance with a result of authentication of a user;
   a display that displays a setting screen for the image generator;
   a console that receives an operation to set the setting screen;
   a memory that stores a set value of the setting screen;
   an on-hold setting receiver that receives a setting to either hold or cancel the set value not completely entered, when the motion sensor is not able to detect the user; and
   a controller that controls the image generator, the motion sensor, the login-logout processor, the display, the console, the memory, and the on-hold setting receiver,
   the controller that causes the memory to store the set value not completely entered and switches the setting screen if the on-hold setting receiver is set to hold the setting not completely entered when the motion sensor is not able to detect the user while the display displays the setting screen, and that cancels the set value not completely entered and switches the setting screen if the on-hold setting receiver is set to cancel the setting not completely entered, wherein
   the on-hold setting receiver receives a setting to manually apply the set value on hold,
   if, after the login of the user, the set value stored at a previous login by the user exists, and if the on-hold setting receiver is set to manually select the set value on hold, the controller causes the display to display a confirmation dialogue to ask the user to select whether to apply the set value,
   if the selection received with the console is to apply the set value, the controller causes the display to display the setting screen to which the set value is applied, and
   if the selection received with the console is to cancel the set value, the controller causes the display to display a predetermined home screen.

* * * * *